(12) United States Patent
Kaehler

(10) Patent No.: US 7,999,923 B2
(45) Date of Patent: Aug. 16, 2011

(54) SYSTEMS AND METHODS FOR DETECTING AND ANALYZING OBJECTS

(75) Inventor: Adrian Kaehler, North Hollywood, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 368 days.

(21) Appl. No.: 12/389,035

(22) Filed: Feb. 19, 2009

(65) Prior Publication Data

US 2010/0208234 A1 Aug. 19, 2010

(51) Int. Cl.
*G01C 3/08* (2006.01)
(52) U.S. Cl. ............. 356/5.01; 356/3.01; 356/4.01; 356/4.1; 356/5.1
(58) Field of Classification Search ........ 356/3.01–3.15, 356/4.01–4.1, 5.01–5.15, 6–22, 28, 28.5; 235/384
See application file for complete search history.

(56) References Cited

U.S. PATENT DOCUMENTS

| | | | |
|---|---|---|---|
| 7,417,717 B2 | 8/2008 | Pack et al. | |
| 2003/0042304 A1* | 3/2003 | Knowles et al. | 235/384 |
| 2005/0068198 A1 | 3/2005 | Brega et al. | |
| 2009/0079986 A1 | 3/2009 | Haag et al. | |

FOREIGN PATENT DOCUMENTS

DE 10 2007 03502 A1 1/2009

OTHER PUBLICATIONS

European Search Report for corresponding EP 10 15 3941, completed May 28, 2010 at The Hague.

* cited by examiner

*Primary Examiner* — Thomas H Tarcza
*Assistant Examiner* — Luke D Ratcliffe
(74) *Attorney, Agent, or Firm* — Tarolli, Sundheim, Covell & Tummino LLP

(57) ABSTRACT

Systems and methods are provided that employ one or more mirrors to harvest laser beams emitted by a physical rangefinder within a region of interest that would otherwise not intersect an object within the region of interest. The mirrors redirect the harvested beams back within the region of interest, creating one or more virtual rangefinders that supplement the physical rangefinder. The location of the virtual rangefinders is symmetric to the position of the physical rangefinder about the plane of the mirror and along the line normal to the mirror passing through the physical rangefinder. The virtual rangefinders, which operate synchronously with the physical rangefinder, thus provide a view of the object(s) from an angle different from that of the physical rangefinder.

20 Claims, 7 Drawing Sheets

SYSTEMS AND METHODS FOR DETECTING AND ANALYZING OBJECTS

TECHNICAL FIELD

The present invention relates generally to computer software, and more particularly to systems and methods for detecting and analyzing objects.

BACKGROUND

Lidar (light detection and ranging) uses laser technology to make precise distance measurements over long or short distances. One application of lidar is the range scanner, or scanning lidar. Lidar transceivers operate on the principle of transmitting laser light that then reflects off of a given object and returns to a lidar receiver. The distance to an object is then determined by analyzing the laser signal through various techniques. During the scanning process, the lidar makes repeated range measurements to objects in its path. Many LIDAR units reflect a pulsed beam of laser light from a rotating mirror to scan across the angular range of the unit (i.e., the "field of view") in a fan-like pattern. The range measurements are thus aligned along a singular angular dimension. Acquiring truly three-dimensional measurements has traditionally required either movement of the laser scanner unit as a whole or more complex actuation of the mirror reflecting the pulsed laser beam, such as scanning in a second angular dimension. Each of these approaches increases the cost of the unit and increases the amount of time required to scan a region of interest.

Three-dimensional laser scanning is relatively commonplace, finding widespread application in industrial design, architecture, civil engineering, military operations, and scientific research. In most systems, the scanner scans its entire field of view one point at a time by changing the rangefinder's direction of view to scan different points. The view direction of the laser rangefinder can be changed by either rotating the rangefinder itself, or by using a system of rotating mirrors. Typically, the entire range of one angular dimension is scanned before the beam is advanced along the other angular dimension. A full scan is thus a time-consuming process. Similarly, some existing systems use a mirror to guide a standard LIDAR beam spread (along a single angular dimension) to a object. For example, in aircraft that use high-powered LIDAR systems for ground scanning, the LIDAR device typically does not move. Instead, a steerable mirror directs the beam to the desired ground region. Similarly, some LIDAR systems use a secondary mirror to steer the beam in the azimuth to allow scanning across an additional dimension.

Despite having found increasingly widespread application in research and industrial applications, scanning LIDAR units remain expensive. LIDAR units typically use a rotating mirror to both emit the laser pulses and receive the reflected light used in the range finding calculations. A particular LIDAR unit is characterized by a fixed angular range, across which the rotating mirror reflects outgoing beams and receives incoming reflections. As increasing the angular range of a unit incurs little or no additional cost, typical modern devices have relatively large angular ranges, from 180 to 270 degrees. However, in many applications, such as those in which objects or portions of an object may be occluded, multiple units (possibly with smaller viewing angles) would be preferred to a single LIDAR unit with a large viewing angle. In such applications, the system cost may become prohibitive. In addition, the operation of multiple units presents significant synchronization challenges.

SUMMARY

In accordance with an aspect of the present invention, a system is provided for detecting and analyzing objects. The system comprises a plurality of reflective walls defining an enclosed region of interest and a light detection and ranging (LIDAR) unit positioned to transmit laser pulses over a plurality of emittance angles within the enclosed region of interest. The LIDAR is configured to calculate the round trip time of flight of each return laser pulse associated with each of a given emittance angle to provide polar data in the form of a distance and emittance angle of an object within the enclosed region of interest for each laser pulse over the plurality of emittance angles. The system further comprises a data analyzer that assigns laser pulses that reflect directly from the object based on a determined round trip time of flight within an enclosed region of interest to a physical rangefinder and that assigns laser pulses that reflect from one or more of the plurality of reflective walls indirectly from the object based on a determined round trip time of flight within the enclosed region of interest to an Nth order virtual rangefinder, where N is the number of reflections of a given transmitted laser pulse off of the plurality of reflective walls prior to contact with the object.

In accordance with an aspect of the invention, a system is provided for detecting and analyzing objects. The system comprises a plurality of reflective walls defining an enclosed region of interest and a LIDAR unit positioned to transmit laser pulses over a plurality of emittance angles within the enclosed region of interest, the LIDAR being configured to calculate the round trip time of flight of each return laser pulse associated with each of a given emittance angle to provide polar data in the form of a distance and emittance angle of an object for each laser pulse over the plurality of emittance angles. The system further comprises a data analyzer that determines which of a plurality of virtual regions of interest associated with the enclosed region of interest that the object is detected for each of a given laser pulse and employs this determination to determine a location and an angle that the given laser pulse contacted the object within the enclosed region of interest.

In accordance with yet another aspect of the invention, a method is provided for detecting and analyzing objects. The method comprises arranging a plurality of reflective walls to define an enclosed region of interest, transmitting laser pulses over a plurality of emittance angles within the enclosed region of interest and calculating the round trip time of flight of each return laser pulse associated with each of a given emittance angle to provide polar data in the form of a distance and emittance angle of an object for each laser pulse over the plurality of emittance angles. The method further comprises converting the polar data for each laser pulse to Cartesian coordinate position data, determining which of a plurality of virtual regions of interest associated with the enclosed region of interest that the object is detected for each of a given laser pulse and subtracting the number of virtual regions of interest in both a X coordinate direction and a Y coordinate direction to determine a location that the given laser pulse contacted the object within the enclosed region of interest for each of a given laser pulse.

DETAILED DESCRIPTION

The systems and methods of the present invention employ one or more mirrors to "harvest" the beams emitted by a LIDAR unit that would otherwise not intersect an object within a region of interest. The mirrors redirect the harvested beams back within the region of interest, creating one or more "virtual" rangefinders that supplement the "physical" rangefinder. The location of the virtual rangefinders is symmetric to the position of the physical rangefinder about the plane of the mirror and along the line normal to the mirror passing through the physical rangefinder. The virtual rangefinders, which operate synchronously with the physical rangefinder, thus provide a view of the object(s) from an angle different from that of the physical rangefinder.

The systems and methods allow for any number of mirrors in most any geometry, and thus the creation of any number of virtual rangefinders, subject to the range limitations of the beams produced by the LIDAR unit. In particular, it is possible to create systems in which the object(s) to be observed are substantially confined within a mirrored boundary, thus creating multiple reflections. If beams reflected from a first mirror are reflected by a second mirror, a "second-order" virtual rangefinder is created, located at a position symmetric to the "first-order" virtual rangefinder about the second mirror. The physical rangefinder can be tilted at an angle along a z-axis relative to an X-Y plane to scan a volume of interest.

Figure 1:
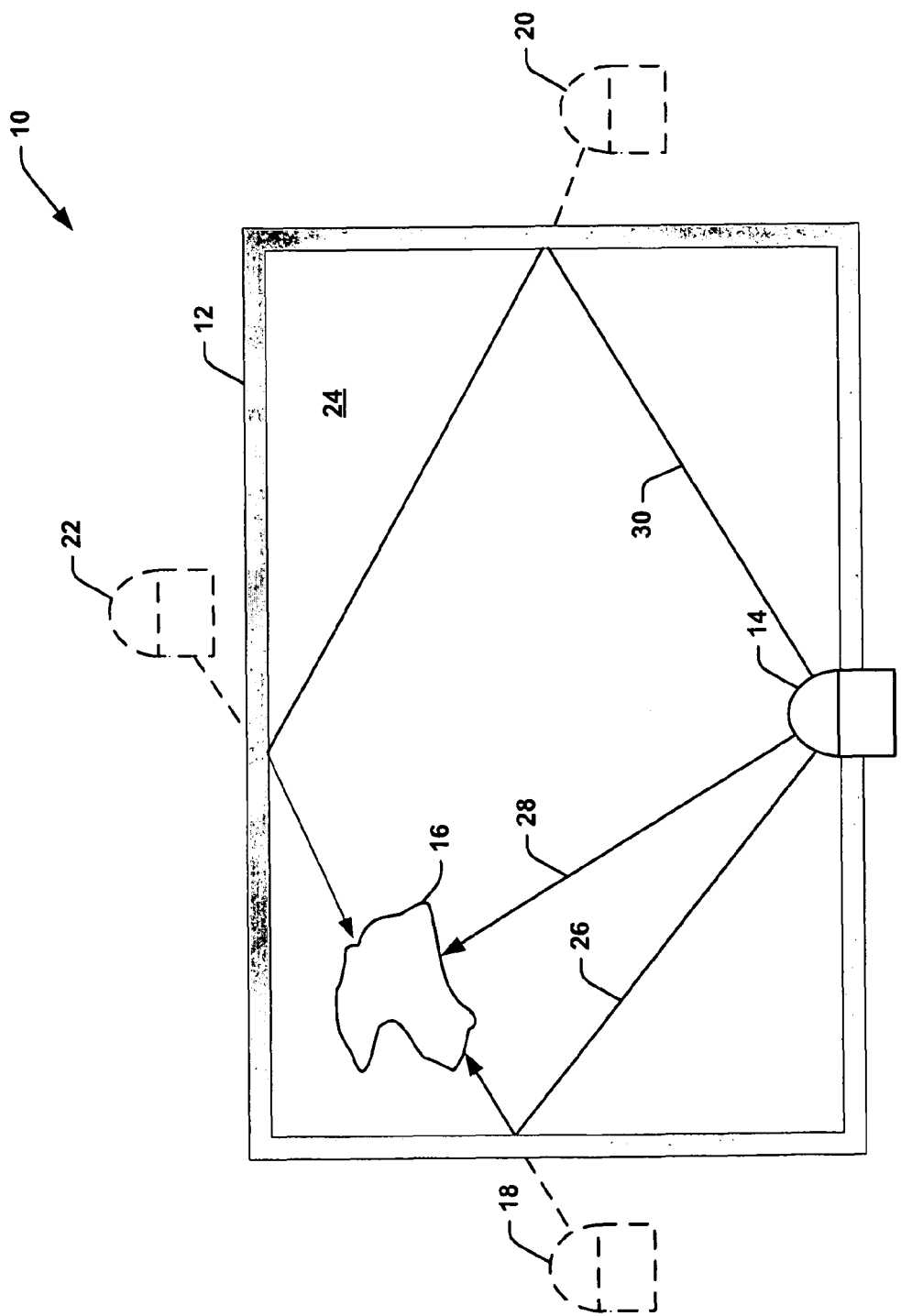
FIG. 1 illustrates a system for detecting and analyzing objects in accordance with an aspect of the present invention.
Figure 6:
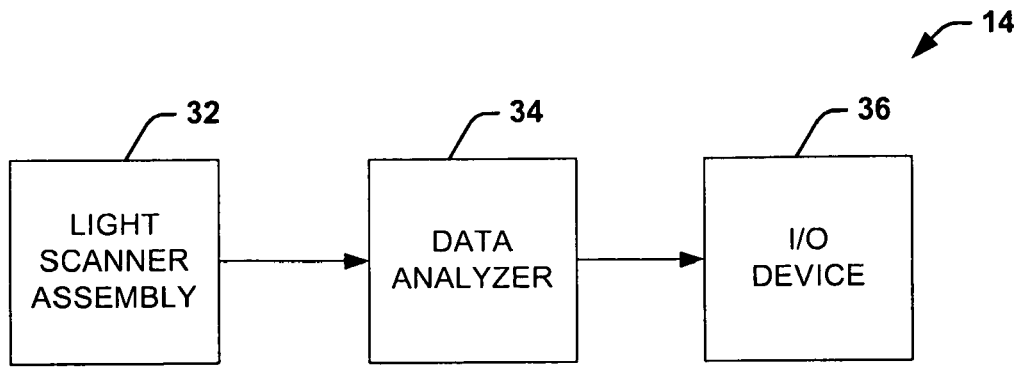
FIG. 6 illustrates a block diagram of a physical laser rangefinder in accordance with an aspect of the present invention.

FIG. 1 illustrates a system 10 for detecting and analyzing objects within an enclosed region 24 of a rectangular box of mirrored surfaces 12 in accordance with an aspect of the present invention. A physical laser rangefinder 14 (i.e., LIDAR unit) is configured and disposed to emit beams into the enclosed region 24 of the rectangular box of mirrored surfaces 12 that encloses one or more objects (e.g., object 16). As illustrated in FIG. 6, the physical laser rangefinder 14 can include a light scanning fan assembly 32, a data analyzer 34 and optionally an input/output unit 36. The data analyzer 34 can receive raw data from the light scanning fan assembly 32 and analyze the raw data to determine one or more characteristics (e.g., shape, location, object type, object direction, distance between objects, object behavior) associated with an object disposed within the enclosed region 24 of rectangular box of mirrored surfaces 12. The data analyzer 34 can be hardware and/or software executing on a separate device (e.g., a computer), or be software executing in a controller of the physical rangefinder 14. The one or more characteristics can be selected and/or displayed employing the input/output unit 36.

The geometry of the rectangular box of mirrored surfaces 12 ensures that the beams emitted will eventually intersect the object 16. Many of the intersections are likely to correspond to virtual rangefinders with viewing angles widely separated from that of the physical rangefinder 14. The LIDAR unit 14 will scan across its angular range, emitting a beam and receiving any reflections at each angular location in a sequential manner. At each angle, the raw data is collected and the range is calculated by a data analyzer associated with the physical rangefinder 14 based on the round trip time of flight of any reflections received. The data analyzer assigns the reflections received from the physical rangefinder 14 or one or more virtual order rangefinders using an emittance angle dependent, temporal windowing scheme. At a given emittance angle, any reflections received within the round trip time of flight to the first point of reflection are assigned to the physical rangefinder 14. Any reflections received between the round trip time of flight to the first point of reflection and the round trip time of flight to the second point of reflection are assigned to a first order virtual rangefinder, and so on, until the useful range of the LIDAR unit is exhausted. The windowing thresholds for each emittance angle are thus based entirely on the geometry of the mirrors relative to the enclosed region and their position and orientation relative to the LIDAR unit 14. The temporal windows may be calculated a priori or may be determined via an in situ calibration process using the LIDAR unit 14 and a test object.

As illustrated in FIG. 1, a first laser beam 26 is transmitted at a first emittance angle by the physical laser rangefinder 14, which reflects off of a first point of reflection associated with a first order virtual rangefinder 18 to the object 16. The physical laser rangefinder 14 receives a reflection of the first laser beam 26 from the object 16, which is assigned to the first order virtual rangefinder 18 based on the round trip time of delay between the physical laser rangefinder 14 and the object 16. A second laser beam 28 is transmitted at a second emittance angle by the physical laser rangefinder 14 directly at the object 16. The physical laser rangefinder 14 receives a reflection of the second laser beam 28 from the object which is assigned to the physical laser rangefinder 14 based on the round trip time of delay between the physical laser rangefinder 14 and the object 16. A third laser beam 30 is transmitted at a third emittance angle by the physical laser rangefinder 14, which reflects off of a first point of reflection associated with a first order virtual rangefinder 20 to a second point of reflection associated with a second order virtual rangefinder 22, which reflects to the object 16. The physical laser rangefinder 14 receives a reflection of the third laser beam 30 from the object 16, which is assigned to the second order virtual rangefinder 22 based on the round trip time of delay between the physical laser rangefinder 14 and the object 16.

Figure 2:
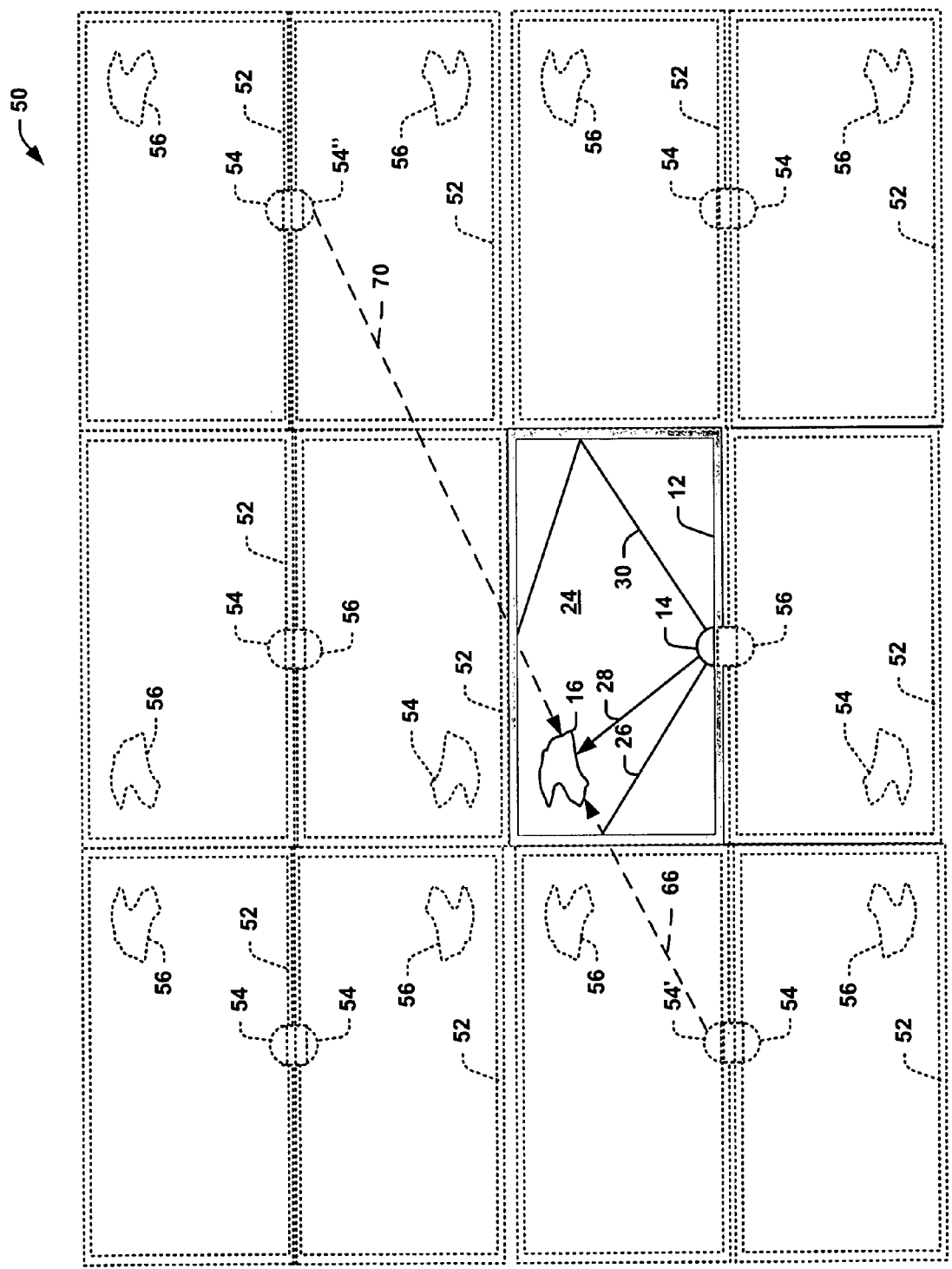
FIG. 2 illustrates a virtual system associated with the system for detecting and analyzing objects of FIG. 1 in accordance with an aspect of the present invention.

FIG. 2 illustrates a virtual system 50 associated with the system for analyzing objects within a rectangular box of mirrored surfaces 12 of FIG. 1 in accordance with an aspect of the present invention. Such an arrangement can be described either as a single enclosure 12 as illustrated in FIG. 1 in which beams 26, 28 and 30 are emitted from a laser range finder 14 within the enclosed region 24 and are reflected from the walls of the enclosure until they are incident on the object 16. In this case laser light emitted from the physical range finder 14 is observed a time t after emission and the time of flight, and combined with the geometry of the box 12 to determine the trajectory and point of absorption of the beam by the object 16. Such arrangements of multiple reflections are most clearly computed with the standard theoretical artifice of a single enclosed region containing a single real laser range finder and a single object.

Alternatively as illustrated in FIG. 2, the theoretical construct of virtual images can be employed in which the walls of the box are replaced with an array of "virtual" boxes 52. These virtual boxes contain virtual images 54 of the laser range finders 14 as well as virtual images 56 of the object 16. Each set of mirrored walls are replaced with a virtual box 52 of the original real box 12 which is appropriately inverted relative to the original real box 16. Because the physical enclosed region 24 has mirrors on all sides, the mirrored walls of the virtual images are themselves replaced by more virtual images and an infinite array is created. By means of this method it is possible to analyze the beams as straight lines in the theoretical infinite plane of virtual range finders and virtual objects, rather than in the enclosure with reflections. Beams which are un-reflected 28 are identical in their representation in the infinite plane. Beams which comprise an image path which is once reflected 26 are equivalent to a beam 66 originating from a virtual range finder 54' passing through the wall on which the reflection occurred. Similarly, a twice reflected beam 30 is equivalent to a beam 70 originating from the virtual range finder 54" two regions away. Any beam with any number of reflections can be equated to a straight beam originating from a distant virtual range finder.

Figure 3:
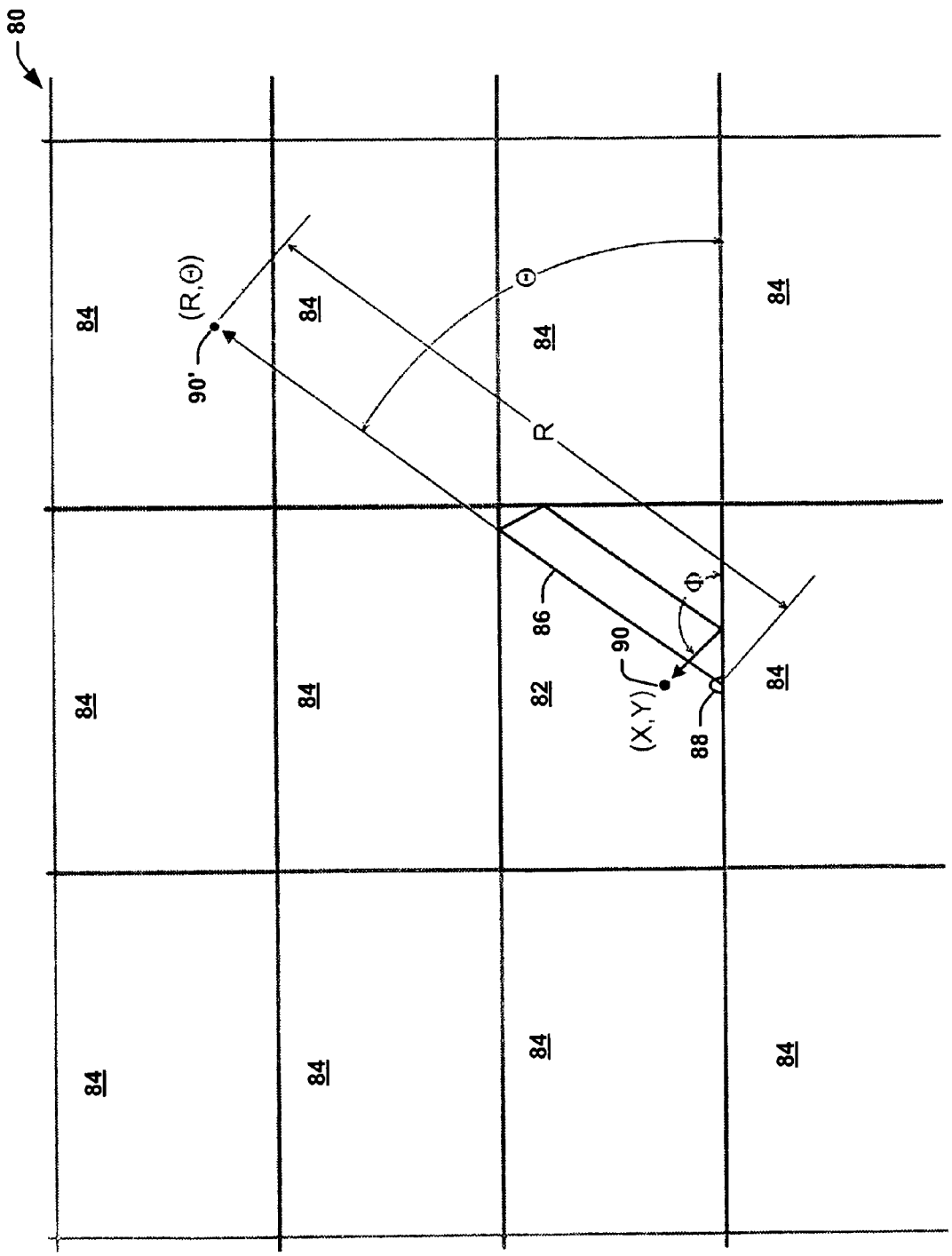
FIG. 3 illustrates a graphical representation of a real system of a single rectangular box of mirrors and a virtual system of virtual rectangular regions in accordance with an aspect of the invention.

FIG. 3 illustrates a graphical representation 80 of a real system of a single rectangular box of mirrors 82 and a virtual system of virtual rectangular regions 84 in accordance with an aspect of the invention. As illustrated in the real system, a laser beam 86 is emitted from a LIDAR unit 88 and is reflected at a first point of reflection at a top wall to a second point of reflection at a right side wall to a third point of reflection at a bottom wall to a detectable object 90 within the rectangular region 82 of the real system. From the point of view of the physical rangefinder 88, the return pulse is received at a distance R at an emittance angle Theta (i.e., polar coordinates). As illustrated in the virtual system, a virtual object 90' lies within a virtual rectangular box 84 that lies one virtual region in the X direction and two virtual regions in the Y direction. The following algorithm can be employed to convert the polar coordinates of the virtual system to Cartesian coordinates of the real system.

Given a sensor return from the LIDAR unit in the form (R, Theta), the following pseudo-code explains how to convert that reading into a measurement of the form (X, Y, Phi), in which X, and Y are positions in the sense area, and Phi is the angle of incidence of the beam coordinates (X1,Y1) which have their origin at the lower left corner of the rectangular region in line 002. The integers Nx and Ny are then computed in 003 by dividing the new coordinates X1, Y1 by the width and height, respectively, of the box and rounding to the integer value of each respective ratio, which indicates which virtual enclosure the return occurred in. In line 004, the coordinates (X2, Y2) are then computed, which are the coordinates of the endpoint of the virtual beam, originating in the lower left corner of the virtual rectangular region with the virtual region subtracted out. The coordinates (X3,Y3) are computed from these, accounting for reflections, and represent the endpoint of the real beam in the real enclosure; these coordinates also originate in the lower left corner of the real enclosure (similar to X1,Y1). For example, in line 005, X3=W−X2 if there are an odd number of X reflections and X3=X2 if there are an even number of X reflections. Furthermore, in line 006, Y3=H−Y2 if there are an odd number of Y reflections and Y3=Y2 if there are an even number of Y reflections.

Finally Phi3 is computed, which is the real angle of the beam which contacted the object within the real enclosure. In line 007, if there are an odd number of X reflections and an odd number of Y reflections, then Phi3=Theta+Pi. In line 008, if there are an odd number of X reflections and an even number of Y reflections, then Phi3=−Theta. In line 009, if there are an even number of X reflections and an odd number of Y reflections, then Phi3=Pi-Theta. In line 010, if there are an even number of X reflections and an even number of Y reflections, then Phi3=Theta. At 011, the X origin is moved back to its original location and the determined coordinates are returned. The return values are equivalent to the (X3,Y3, Phi3) triplet, but are displaced by half of the width of the enclosure, so as to have the effective origin of the returned coordinates at the same point as the origin of the polar coordinates passed to the function compute_xyphi( ) from outside (i.e. on top of the scanning rangefinder device). In practice, with mirrors that are not perfectly perpendicular, the plane of each mirror experimentally determine in a calibration step, then virtual beam is iteratively "folded" where it intersects the mirrors, and the folding process is terminated when the end point of the beam is in the sense area.

Figure 4:
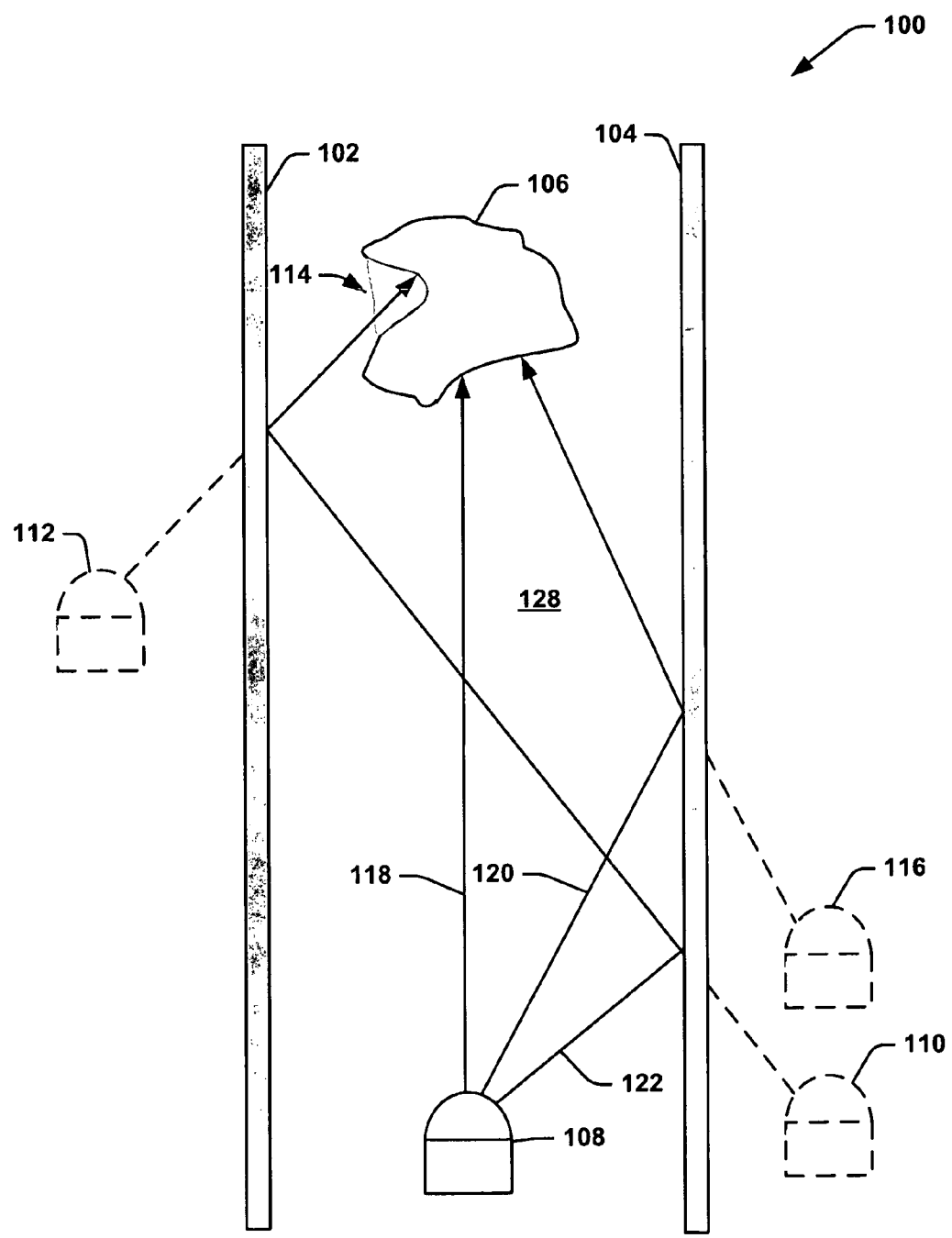
FIG. 4 illustrates another system for detecting and analyzing objects in accordance with an aspect of the present invention.

FIG. 4 illustrates another system 100 for detecting and analyzing objects in accordance with an aspect of the present invention. A physical laser rangefinder 108 is disposed equidistant from (i.e. between) two parallel mirrors 102 and 104 that form an enclosed region 128. The LIDAR unit 108 is oriented such that the LIDAR beams (which typically radiate from the LIDAR unit in a fan-like manner) lie within a plane perpendicular to the mirrors 102 and 104 and at an end of a

```
compute_xyphi( R, Theta ):

001 ( W, H ) = ( width_of_box, height_of_box )    // Width and Height of Box
002 ( X1, Y1 ) = ( R*cos(Theta)+W/2, R*sin(Theta) ) // Move X Origin to left corner
003 ( Nx, Ny ) = ( floor(X1/W), floor(Y1/H) )    //Determine virtual region (Integer)
004 ( X2, Y2 ) = ( X1−Nx*W, Y1−Ny*H )    // Location within real region
005 if( Nx%2 ) X3 = W−X2 else X3 = X2    // true if odd # of X reflections
006 if( Ny%2 ) Y3 = H−Y2 else Y3 = Y2    // true if odd # of Y reflections
007 if( Nx%2 and Ny%2 ) Phi3 = Theta + Pi    // true if odd # X and odd # Y reflections
008 else if( Nx%2 ) Phi3 = − Theta    // else odd # X and even # Y reflections
009 else if( Ny%2 ) Phi3 = Pi − Theta    // else even # X and odd # Y reflections
010 else Phi3 = Theta    // else even # X and even # Y reflections
011 return( X3 − W/2, Y3, Phi3 )    // Move X Origin to Center and Return values
```

In the code sample above, the width and height of the rectangular region of mirrored surfaces is defined in line 001. The initial sensor return (R,Theta) is converted first to new mirrored "hallway". The geometry thus allows for thorough beam coverage of a single plane within the mirrored "hallway". As illustrated in FIG. 4, a first laser beam 118 is transmitted at a first emittance angle by the physical laser rangefinder 108, directly at an object 106 that lies within the enclosed region 128. The physical laser rangefinder 108 receives a reflection of the first laser beam 118 from the object 106 which is assigned to the physical laser rangefinder 108 based on the round trip time of delay between the physical laser rangefinder 108 and the object 106. A second laser beam 120 is transmitted at a second emittance angle by the physical laser rangefinder 108, which reflects off of a first point of reflection associated with a first order virtual rangefinder 116 to the object 106. The physical laser rangefinder 108 receives a reflection of the second laser beam 120 from the object 106, which is assigned to the first order virtual rangefinder 116 based on the round trip time of delay between the physical laser rangefinder 108 and the object 106. A third laser beam 122 is transmitted at a third emittance angle by the physical laser rangefinder 108, which reflects off of a first point of reflection associated with a first order virtual rangefinder 110 to a second point of reflection associated with a second order virtual rangefinder 112, which reflects to the object 106. The physical laser rangefinder 108 receives a reflection of the third laser beam 122 from the object 106, which is assigned to the second order virtual rangefinder 112 based on the round trip time of delay between the physical laser rangefinder 108 and the object 106.

The area of the object 106 reflected by the third laser beam 122 is a dark region 114 which cannot be detected by a conventional LIDAR without the use of the one or more mirrored surfaces. The present invention seeks to address the problem of object occlusion in laser range finding without reliance on multiple LIDAR units. Occlusion may occur in multi-object applications when one object passes in front of another or in single-object applications when a concave shape and orientation of the object yields "dark regions". As noted, the invention creates virtual rangefinders from a single conventional LIDAR unit using one or more mirrors. The additional rangefinders provide additional viewing angles that address the occlusion problem by "seeing around" foreground objects, and illuminating otherwise dark regions on a object of interest. In comparison to a system incorporating multiple LIDAR units, the invention offers several advantages. As the virtual rangefinders operate synchronously with the physical rangefinder, the task of integrating the measurements from the physical and virtual rangefinders is greatly simplified. In contrast, the process of fusing multiple signals from separate LIDAR units is a difficult one. The invention also yields many more hits on the object at what is effectively a much higher frequency. Thus, even in applications where occlusion is not present, the approach is still advantageous in that the motion of the object can be resolved with greater temporal resolution.

The example of FIGS. 1, 2 and 4 are illustrated with three emittance angles and laser beams. However, a typical LIDAR unit will transmit a much greater number of laser beams through a much greater number of emittance angles (e.g., 180 one degree angles, 270 one degree angles). It is to be appreciated that a much larger number of data points can be captured by employing one or more mirrored surfaces in cooperation with a LIDAR as illustrated in FIGS. 1, 2 and 4. While the present invention is most conveniently based on a scanning LIDAR unit incorporating a rotating mirror, the invention may also be constructed from scanning LIDAR units incorporating electro-optical or acousto-optical beam direction.

In another aspect of the invention, one or more planar scanning laser rangefinders (LINDAR units) and one or more mirrored surfaces are inclined to the scanning fan of the rangefinders and enclose (either fully or partially) a volume of interest. As the beams of the laser rangefinders are reflected one or more times by the mirrors, they traverse and potentially intersect the object(s) in a three-dimensional volume. For example, assuming that the embodiments of FIGS. 1-4 are illustrated with respect to the one or more mirrors and the physical rangefinders being disposed along an X-Y plane, the physical rangefinders can be tilted along an angle relative to a Y-Z plane normal to the X-Y plane to provide for the ability to scan a volume of interest along both the X-Y and Y-Z planes. As the beams reflect from the mirrors, the beams would traverse the region of interest in the z dimension.

Figure 5:
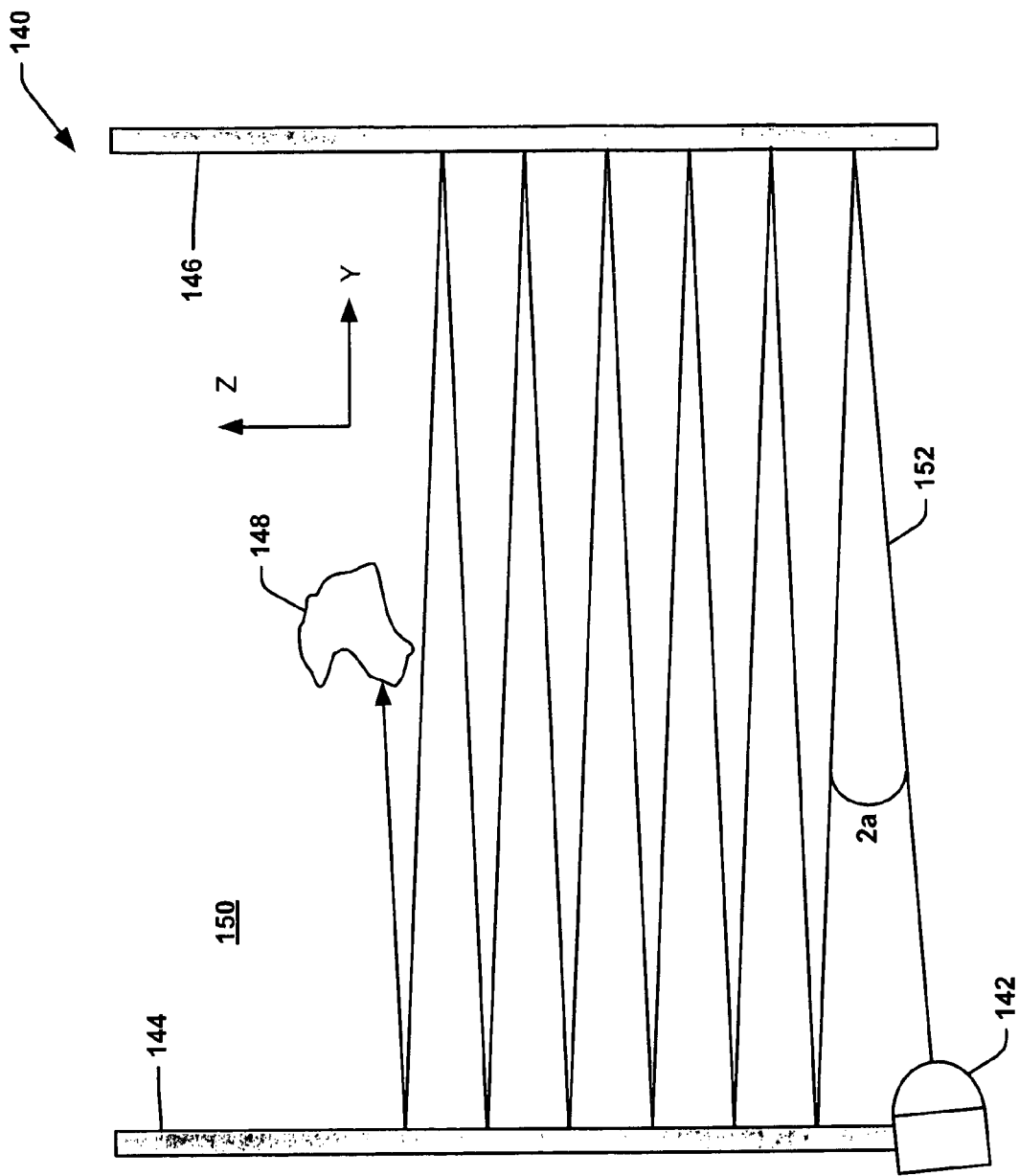
FIG. 5 illustrates yet another system for detecting and analyzing objects in accordance with an aspect of the present invention.

FIG. 5 illustrates yet another system 140 for detecting and analyzing objects (object 148) in an enclosed volume 150 of interest in accordance with an aspect of the present invention. As can be seen in the figure detailing the Y-Z plane, a physical rangefinder 142 is tilted along an angle relative to the Y-Z plane to transmit beams 152 between a pair of mirrored surfaces 144 and 146 forming the enclosed volume at an angle a relative to a Z-axis direction. The beams may intersect the object 148 directly (not illustrated) or after one or more reflections as illustrated in FIG. 5. The Z location of the point of intersection with the object 148 is computed based on the time of flight and angle of inclination a. Preferably, a is as small as possible given the extent of the region of interest in the X-Y plane and the range of the LIDAR unit 142, thus providing as fine a resolution as possible in the Z dimension.

The tilting of the physical rangefinder 142 addresses the challenge of acquiring three-dimensional range data without the additional cost and operational time associated with movement of the LIDAR unit 142 or direction of the laser beam (by the LIDAR unit) along more than one angular dimension. As described above, the invention inclines a LIDAR unit 142 relative to the mirrors 144 and 146 of a reflective enclosure to provide three-dimensional laser range finding capability. The reflected beams scan increasingly higher portions of the enclosed volume, effectively "folding" the range of the LIDAR unit in three-dimensional space. The system 140 thus allows for conversion of the ordinarily two-dimensional data of the LIDAR unit 142 to three-dimensional spatial data. The resulting data can be used to estimate the volumetric characteristics of an object or determine and track the location of objects fully within or protruding into the scanned volume 150.

Unlike most current approaches to the three-dimensional range finding, this capability is provided with a standard two-dimensional LIDAR unit. Thus, for those applications in which the object(s) can be confined within a mirrored enclosure, the invention provides three-dimensional range finding without the increased costs or reduced scanning rates associated with natively three-dimensional laser scanners. While the invention does not provide the high resolution of some existing laser scanners, it is able to scan the entire volume of interest very rapidly. The invention is thus well suited to track objects (such as a user's fingers) moving inside of the scanned volume. The invention is capable (in principle) of tracking a dozen or more moving objects.

Figure 7:
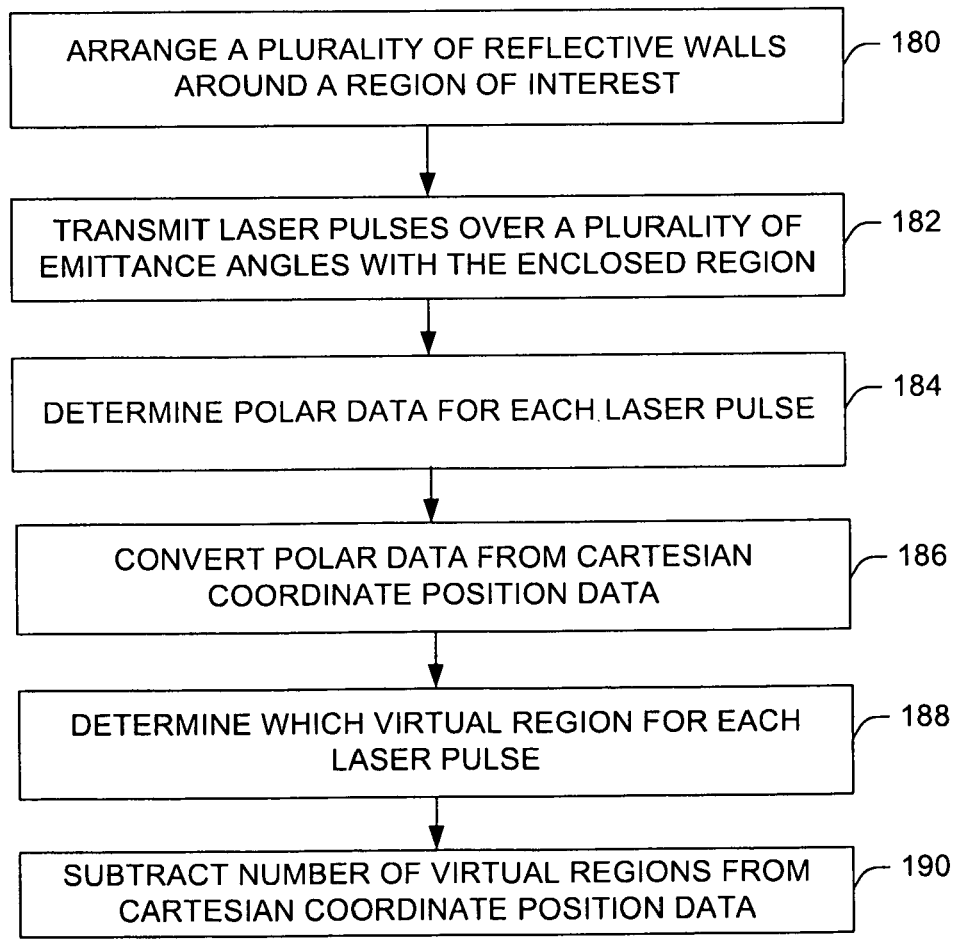
FIG. 7 illustrates a method for detecting and analyzing objects in accordance with an aspect of the present invention.

FIG. 7 illustrates a methodology for detecting and analyzing objects within a region of interest in accordance with an aspect of the present invention. The method begins at 180 where a plurality of reflective walls are arranged to define an enclosed region of interest. At 182, laser pulses are transmitted over a plurality of emittance angles within the enclosed region of interest. At 184, the round trip time of flight is calculated for each return laser pulse associated with each of a given emittance angle to provide polar data in the form of a distance and an emittance angle of an object for each laser pulse over the plurality of emittance angles. At 186, the polar data for each laser pulse is converted to Cartesian coordinate position data. At 188, a plurality of virtual regions of interest are determined associated with the enclosed region of interest that the object is detected for each of a given laser pulse. At 188, the number of virtual regions of interest in both a X coordinate direction and a Y coordinate direction are subtracted from the Cartesian coordinate position data to determine a location that the given laser pulse contacted the object within the enclosed region of interest for each of the given laser pulse.

Figure 8:
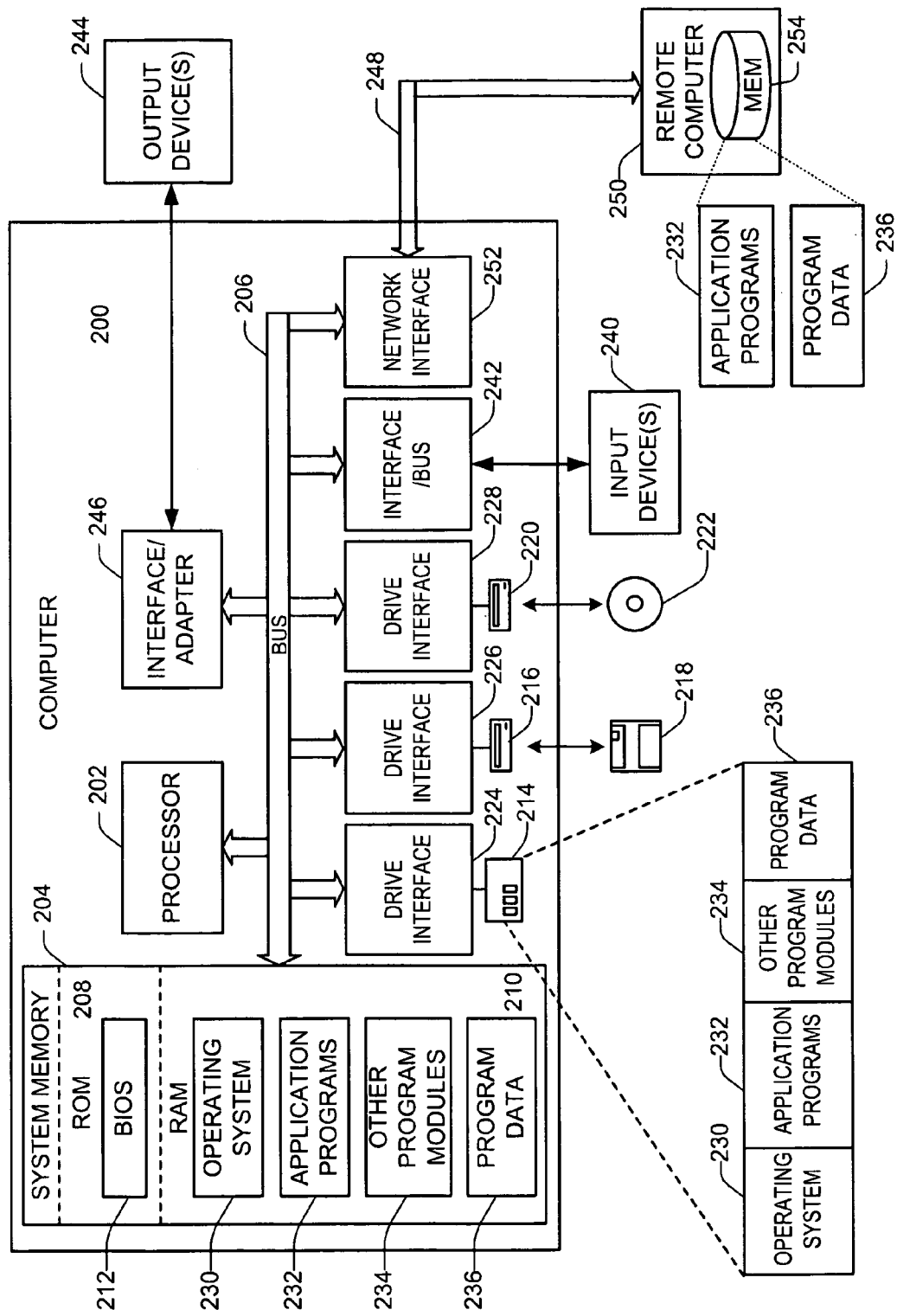
FIG. 8 illustrates a computer system that can be employed to implement systems and methods described herein in accordance with an aspect of the present invention.

FIG. 8 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 210, including an operating system 230, one or more application programs 232, other program modules 234, and program data 236, such as a data analyzer for detecting and analyzing objects within a region of interest.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 250 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

Having described the invention, the following is claimed:

1. A system for detecting and analyzing objects, the system comprising:
    a plurality of reflective walls defining an enclosed region of interest;
    a light detection and ranging (LIDAR) unit positioned to transmit laser pulses over a plurality of emittance angles within the enclosed region of interest, the LIDAR being configured to calculate the round trip time of flight of each return laser pulse associated with each of a given emittance angle to provide polar data in the form of a distance and emittance angle of an object within the enclosed region of interest for each laser pulse over the plurality of emittance angles; and
    a data analyzer that assigns laser pulses that reflect directly from the object based on a determined round trip time of flight within an enclosed region of interest to a physical rangefinder and that assigns laser pulses that reflect from one or more of the plurality of reflective walls indirectly from the object based on a determined round trip time of flight with the enclosed region of interest to an Nth order virtual rangefinder, where N is the number of reflections of a given transmitted laser pulse off of the plurality of reflective walls prior to contact with the object.

2. The system of claim 1, wherein the plurality of reflective walls form a rectangular box of mirrored surfaces.

3. The system of claim 1, wherein the plurality of reflective walls form a mirrored hallway with the LIDAR unit being positioned at one end of the mirrored hallway.

4. The system of claim 1, wherein the data analyzer determines which of a plurality of virtual regions of interest associated with the enclosed region of interest that an object is detected for each of a given laser pulse and employs this determination to determine a location and an angle that the given laser pulse contacted the object within the enclosed region of interest.

5. The system of claim 4, wherein the data analyzer converts the polar data to Cartesian coordinate position data and subtracts the number of virtual regions of interest in both a X coordinate direction and a Y coordinate direction from the Cartesian coordinate position data to determine at what location that the given laser pulse contacted the object within the enclosed region of interest.

6. The system of claim 5, wherein the data analyzer evaluates the number of odd and even X coordinate and Y coordinate reflections to determine at what location that the given laser pulse contacted the object within the enclosed region of interest.

7. The system of claim 6, wherein the data analyzer evaluates the number of odd and even X coordinate and Y coordinate reflections to determine an angle that the given laser pulse contacted the object within the enclosed region of interest.

8. The system of claim 1, wherein the LIDAR unit is angled along an axis normal to the region of interest to provide three-dimensional spatial data of the object within a volume of interest.

9. The system of claim 1, wherein the data analyzer is one of a controller residing in the LIDAR unit and a separate computer unit.

10. A system for detecting and analyzing objects, the system comprising:
    a plurality of reflective walls defining an enclosed region of interest;
    a light detection and ranging (LIDAR) unit positioned to transmit laser pulses over a plurality of emittance angles within the enclosed region of interest, the LIDAR being configured to calculate the round trip time of flight of each return laser pulse associated with each of a given emittance angle to provide polar data in the form of a distance and emittance angle of an object for each laser pulse over the plurality of emittance angles; and
    a data analyzer that determines which of a plurality of virtual regions of interest associated with the enclosed region of interest that the object is detected for each of a given laser pulse and employs this determination to determine a location and an angle that the given laser pulse contacted the object within the enclosed region of interest.

11. The system of claim 10, wherein the plurality of reflective walls form a rectangular box of mirrored surfaces.

12. The system of claim 10, wherein the plurality of reflective walls form a mirrored hallway with the LIDAR unit being positioned at one end of the mirrored hallway.

13. The system of claim 10, wherein the data analyzer converts the polar data to Cartesian coordinate position data and subtracts the number of virtual regions of interest in both a X coordinate direction and a Y coordinate direction from the Cartesian coordinate position data to determine a location that the given laser pulse contacted the object within the enclosed region of interest.

14. The system of claim 13, wherein the data analyzer evaluates the number of odd and even X coordinate and Y coordinate reflections to determine at what location that the given laser pulse contacted the object within the enclosed region of interest.

15. The system of claim 14, wherein the data analyzer evaluates the number of odd and even X coordinate and Y coordinate reflections to determine an angle that the given laser pulse contacted the object within the enclosed region of interest.

16. The system of claim 10, wherein the LIDAR unit is angled along an axis normal to the region of interest to provide three-dimensional spatial data of the object within a volume of interest.

17. A method for detecting and analyzing objects, the method comprising:
    arranging a plurality of reflective walls to define an enclosed region of interest;
    transmitting laser pulses over a plurality of emittance angles within the enclosed region of interest;
    calculating the round trip time of flight of each return laser pulse associated with each of a given emittance angle to provide polar data in the form of a distance and emittance angle of an object for each laser pulse over the plurality of emittance angles;
    converting the polar data for each laser pulse to Cartesian coordinate position data;
    determining which of a plurality of virtual regions of interest associated with the enclosed region of interest that the object is detected for each of a given laser pulse; and
    subtracting the number of virtual regions of interest in both a X coordinate direction and a Y coordinate direction to determine a location that the given laser pulse contacted the object within the enclosed region of interest for each of a given laser pulse.

18. The method of claim 17, further comprising evaluating the number of odd and even X coordinate and Y coordinate reflections to determine a location that the given laser pulse contacted the object within the enclosed region of interest.

19. The method of claim 18, further comprising evaluating the number of odd and even X coordinate and Y coordinate reflections to determine an angle that the given laser pulse contacted the object within the enclosed region of interest.

20. The method of claim 17, wherein the transmitting laser pulses over a plurality of emittance angles within the enclosed region of interest further comprises transmitting laser pulses at an angle along an axis normal to the region of interest to provide three-dimensional spatial data of the object within a volume of interest.

* * * * *